United States Patent
Guo et al.

(10) Patent No.: US 12,424,947 B2
(45) Date of Patent: Sep. 23, 2025

(54) POWER SUPPLY QUALITY IMPROVEMENT-ORIENTED AND FAULT CONTROL-ORIENTED ECONOMICALLY-INTEGRATED MEDIUM-VOLTAGE GRID-CONNECTED DEVICE WITH SIC MODULE AND ADAPTIVE CONTROL METHOD THEREFOR

(71) Applicant: Hunan University, Changsha (CN)

(72) Inventors: Qi Guo, Changsha (CN); Fan Xiao, Changsha (CN); Xin Wang, Changsha (CN); Fei Jiang, Changsha (CN); Xiaomeng He, Changsha (CN); Liu Long, Changsha (CN); Xinjun Qian, Changsha (CN); Chunming Tu, Changsha (CN)

(73) Assignee: Hunan University, Changsha (CN)

( * ) Notice: Subject to any disclaimer, the term of this patent is extended or adjusted under 35 U.S.C. 154(b) by 0 days.

(21) Appl. No.: 19/088,122

(22) Filed: Mar. 24, 2025

(65) Prior Publication Data

US 2025/0226765 A1    Jul. 10, 2025

(30) Foreign Application Priority Data

Sep. 30, 2024 (CN) .......................... 202411384009.7

(51) Int. Cl.
*H02M 7/487* (2007.01)
*H02J 3/00* (2006.01)
(Continued)

(52) U.S. Cl.
CPC ............. *H02M 7/487* (2013.01); *H02J 3/001* (2020.01); *H02M 7/49* (2013.01); *H02M 7/53875* (2013.01); *H02J 2203/10* (2020.01)

(58) Field of Classification Search
CPC .... H02M 7/487; H02M 7/49; H02M 7/53875; H02J 3/001; H02J 2203/10
See application file for complete search history.

(56) References Cited

U.S. PATENT DOCUMENTS

| 2004/0088623 A1 | 5/2004 | Loh |
| 2009/0182508 A1 | 7/2009 | Serth et al. |
| 2025/0023358 A1 | 1/2025 | Murakami |

FOREIGN PATENT DOCUMENTS

| CN | 102739100 A | * 10/2012 | |
| CN | 109347347 A | * 2/2019 | ............ H02M 7/483 |

(Continued)

OTHER PUBLICATIONS

Machine translation CN-102739100-A (Year: 2012).*

(Continued)

*Primary Examiner* — Thienvu V Tran
*Assistant Examiner* — Yahveh Comas Torres

(57) ABSTRACT

An adaptive control method for a fault control-oriented economically-integrated medium-voltage grid-connected device with a silicon carbide (SiC) module, includes: calculating a three-phase bridge arm modulation wave and a fourth bridge arm modulation wave; obtaining a three-phase bridge arm neutral point clamped (NPC) circuit switching signal; obtaining a three-phase bridge arm NPC circuit output voltage; obtaining a fourth bridge arm NPC circuit switching signal; obtaining a fourth bridge arm NPC circuit output voltage; calculating a voltage-stabilizing active vector of each submodule of a cascaded H-bridge (CHB) circuit; obtaining a three-phase bridge arm CHB circuit switching signal; obtaining a fourth bridge arm CHB circuit switching signal based on the fourth bridge arm modulation wave, the fourth bridge arm NPC circuit output voltage, and the voltage-stabilizing active vector of each submodule of (Continued)

the CHB circuit; and performing adaptive control of a grid-connected device based on the CHB circuit switching signal.

10 Claims, 7 Drawing Sheets

(51) Int. Cl.
*H02M 7/49* (2007.01)
*H02M 7/5387* (2007.01)

(56) References Cited

FOREIGN PATENT DOCUMENTS

| CN | 112865060 | A | * | 5/2021 | ............... H02H 9/08 |
|---|---|---|---|---|---|
| CN | 116054186 | A | * | 5/2023 | ............ H02J 3/1857 |
| CN | 116316926 | A | * | 6/2023 | ................ H02J 5/00 |
| CN | 116436329 | A | * | 7/2023 | ........ H02M 7/53875 |
| CN | 114094562 | B | * | 3/2024 | ............... H02H 9/08 |
| CN | 117914170 | A | * | 4/2024 | ............ H02M 1/088 |
| CN | 118074554 | A | * | 5/2024 | ........ H02M 7/53871 |

OTHER PUBLICATIONS

Machine translation CN-109347347-A (Year: 2019).*
Machine translation CN-116316926-A (Year: 2023).*
Machine translation CN-116436329-A (Year: 2023).*
Machine translation CN-117914170-A (Year: 2024).*
Machine translation CN-112865060-A (Year: 2021).*
Machine translation CN-118074554-A (Year: 2024).*
Machine translation CN-114094562-B (Year: 2024).*
Machine Translation CN-116054186-A (Year: 2023).*

* cited by examiner

POWER SUPPLY QUALITY IMPROVEMENT-ORIENTED AND FAULT CONTROL-ORIENTED ECONOMICALLY-INTEGRATED MEDIUM-VOLTAGE GRID-CONNECTED DEVICE WITH SIC MODULE AND ADAPTIVE CONTROL METHOD THEREFOR

CROSS-REFERENCE TO RELATED APPLICATIONS

This application claims priority to Chinese Patent Application No. 202411384009.7 with a filing date of Sep. 30, 2024. The content of the aforementioned application, including any intervening amendments thereto, is incorporated herein by reference.

TECHNICAL FIELD

The present disclosure relates to the field of support against a single-phase grounding fault in a distribution network, and in particular, to an adaptive control method for a fault control-oriented economically-integrated medium-voltage grid-connected device with a silicon carbide (SiC) module.

BACKGROUND

A distribution network goes deep into user terminals, and incurs random faults frequently. Among the faults, single-phase grounding faults (SPG) account for the highest proportion. With the increase of the proportion of cables in the distribution network and the connection of massive non-linear loads, the active component and the harmonic component of a grounding fault current have increased significantly, making it difficult for a conventional passive arc suppression device to effectively suppress the single-phase grounding faults.

A cascaded H-bridge (CHB)-based integrated fault control device (IFCD) can give full play to the characteristics of flexible control of power electronics, implement efficient and high-quality control of power quality and grounding faults, and effectively improve the asset utilization rate of the distribution network. However, considering the asymmetric characteristics of the single-phase grounding faults, the three-arm IFCD structure needs to bear a line voltage, thereby resulting in a large number of submodules cascaded and high cost, and severely restricting the application and promotion of the device. In order to reduce the number of cascaded submodules of the IFCD, a four-arm IFCD has attracted extensive attention and research. In the prior art, there is a four-arm CHB-IFCD with an energy supply device. This structure uses a CHB circuit of the fourth bridge arm to bear the fault-phase voltage, thereby reducing the voltage borne by the remaining three bridge arms to the phase voltage, and effectively reducing the number of submodules cascaded. In the prior art, there is also a four-arm hybrid cascaded multilevel-IFCD (HCM-IFCD) with an energy supply device. The HCM-IFCD gives full play to the advantages of high voltage tolerance of a neutral point clamped (NPC) converter and high switching frequency of the CHB, further reduces the number of submodules cascaded, and effectively improves the power density of the device. However, when the four-arm IFCD fully compensates for the faulty current, the energy stored in the DC-side capacitor of the fourth-arm CHB needs to be consumed, and a power supply device needs to be added to provide energy support, thereby severely impairing the cost-effectiveness and the power density advantage of the four-arm IFCD.

Therefore, a new technical solution is urgently needed to solve the technical problem of how to implement full compensation for the faulty current by a four-arm IFCD while ensuring self-stabilization of the DC side of the IFCD without the need for an additional power supply device.

SUMMARY OF PRESENT INVENTION

The present disclosure provides an adaptive control method for a fault control-oriented economically-integrated medium-voltage grid-connected device with a SiC module to solve the technical problem of how to implement full compensation for the faulty current by a four-arm IFCD while ensuring self-stabilization of the DC side of the IFCD without the need for an additional power supply device.

To achieve the above objective, the present disclosure provides an adaptive control method for a fault control-oriented economically-integrated medium-voltage grid-connected device with a SiC module, including:

calculating a three-phase bridge arm modulation wave and a fourth bridge arm modulation wave; obtaining a three-phase bridge arm NPC circuit switching signal based on the three-phase bridge arm modulation wave; obtaining a three-phase bridge arm NPC circuit output voltage based on the three-phase bridge arm NPC circuit switching signal; obtaining a fourth bridge arm NPC circuit switching signal based on the fourth bridge arm modulation wave; obtaining a fourth bridge arm NPC circuit output voltage based on the fourth bridge arm NPC circuit switching signal; and performing feedback closed-loop control on a capacitor voltage of each submodule of the CHB circuit separately to obtain a voltage-stabilizing active vector of each submodule of the CHB circuit;

obtaining a three-phase bridge arm CHB circuit switching signal based on the three-phase bridge arm modulation wave, the three-phase bridge arm NPC circuit output voltage, and the voltage-stabilizing active vector of each submodule of the CHB circuit; and obtaining a fourth bridge arm CHB circuit switching signal based on the fourth bridge arm modulation wave, the fourth bridge arm NPC circuit output voltage, and the voltage-stabilizing active vector of each submodule of the CHB circuit; and performing adaptive control on the grid-connected device based on the three-phase bridge arm CHB circuit switching signal and the fourth bridge arm CHB circuit switching signal.

Preferably, the calculating a three-phase bridge arm modulation wave and a fourth bridge arm modulation wave includes: calculating the three-phase bridge arm modulation wave, and calculating the fourth bridge arm modulation wave.

The calculating the three-phase bridge arm modulation wave includes:

obtaining a DC-side voltage of an NPC circuit to obtain a first voltage; obtaining a sum of capacitor voltages of CHB circuit submodules to obtain a second voltage; and subtracting the first voltage and the second voltage from a third voltage to obtain a first difference, where the third voltage includes a sum of a preset reference value of the DC-side voltage of the NPC circuit and a preset reference value of the sum of the capacitor voltages of the CHB circuit submodules; and performing feedback closed-loop control on the first difference to obtain a reference value of a voltage-stabilizing active current; obtaining a reference value of a reactive compensation current based on a preset reactive compensation instruction; obtaining a sample value of the voltage-stabilizing active current and a sample value of the reactive compensation current of a three-phase bridge arm, and subtracting the sample values from the reference value of the voltage-stabilizing active current and the reference value of the reactive compensation current to obtain a second difference and a third difference, respectively; and performing feedback closed-loop decoupling control on the second difference and the third difference to obtain a three-phase bridge arm modulation wave.

The obtaining a reference value of a reactive compensation current based on a preset reactive compensation instruction includes:

issuing the preset reactive compensation instruction by a higher-level dispatch system, denoted as $Q_z^*$ so that the reference value of the reactive compensation current $I_{zq}^*$ is denoted by the following relation:

$$I_{zq}^* = \frac{2Q_z^*}{3U_d}$$

In the relation above, $U_d$ is an active vector of a grid voltage.

The calculating the fourth bridge arm modulation wave includes:

calculating a reference value of an output current of a fourth bridge arm based on distribution network information; obtaining a sample value of the output current of the fourth bridge arm, subtracting the sample value from the reference value of the output current of the fourth bridge arm to obtain a fourth difference; and performing feedback closed-loop control on the fourth difference, and performing feedforward control on an output voltage of the fourth bridge arm additionally to obtain a fourth bridge arm modulation wave;

Preferably, the performing feedback closed-loop decoupling control on the second difference and the third difference to obtain a three-phase bridge arm modulation wave includes:

$$\begin{cases} V_d = -(K_{pi} + K_{ii}/s)(I_{zd}^* - I_{zd}) + \omega L I_{zq} + U_d \\ V_q = -(K_{pi} + K_{ii}/s)(I_{zq}^* - I_{zq}) + \omega L I_{zd} + U_q \end{cases}$$

$$\begin{bmatrix} u_a^*(t) \\ u_b^*(t) \\ u_c^*(t) \end{bmatrix} = \begin{bmatrix} \cos\theta & -\sin\theta & 1 \\ \cos(\theta - 120°) & -\sin(\theta - 120°) & 1 \\ \cos(\theta + 120°) & -\sin(\theta + 120°) & 1 \end{bmatrix} \begin{bmatrix} V_d \\ V_q \\ 0 \end{bmatrix}$$

In the formula above, $u_a^*(t)$ $u_b^*(t)$, and $u_c^*(t)$ are three-phase bridge arm modulation waves; θ is an angle between a d-axis and a phase reference axis; ω is an angular frequency of a power grid; and Z is a filter inductance value; $V_d$ represents the d-axis component of the three-phase bridge arm modulation wave; $V_q$ represents a q-axis component of the three-phase bridge arm modulation wave; $U_q$ represents a reactive vector of the grid voltage; $K_{pi}$ represents a proportional coefficient of a PI controller; $K_{ii}$ represents an integral coefficient of the PI controller; $I_{zd}^*$ represents the reference value of the voltage-stabilizing active current; $I_{zd}$ represents the sample value of the voltage-stabilizing active current; $I_{zq}$ represents the sample value of the reactive compensation current; s represents a variable in a complex frequency domain.

Preferably, the calculating a reference value of an output current of a fourth bridge arm based on distribution network information includes:

using the following relation to represent the reference value of the output current $I_{z0}^*$ of the fourth bridge arm when a single-phase grounding fault occurs on phase x:

$$I_{z0}^* = (\dot{E}_y - \dot{E}_x)(1/r_{0y} + j\omega C_{0y}) + (\dot{E}_w - \dot{E}_x)(1/r_{0w} + j\omega C_{0w})$$

In the relation above, $\dot{E}_x$ is an x-phase power-grid phase voltage; $\dot{E}_y$ and $\dot{E}_w$ are power-grid phase voltages of remaining two phases other than the x-phase; $r_{0y}$ and $r_{0w}$ are resistances-to-ground of the remaining two phases other than the x-phase; and $C_{0y}$ and $C_{0w}$ are capacitances-to-ground of the remaining two phases other than the x-phase; j represents an imaginary unit of a complex number.

Preferably, the performing feedback closed-loop control on the fourth difference, and performing feedforward control on an output voltage of the fourth bridge arm additionally to obtain a modulation wave of the fourth bridge arm includes:

$$u_0^*(t) = (K_p + \frac{2K_r \omega_c s}{s^2 + 2\omega_c s + \omega_0^2})(I_{z0}^* - I_{z0}) + u_0(t)$$

wherein, $u_0^*(t)$ is the modulation wave of the fourth bridge arm; $K_p$ and $K_r$ are a proportional coefficient and an integral coefficient of a PR controller respectively; $\omega_c$ is a resonant frequency band width; $\omega_0$ is a resonant frequency point; $I_{z0}$ is an output current of the fourth bridge arm; and $u_0(t)$ is an output voltage of the fourth bridge arm.

Preferably, the obtaining a three-phase bridge arm NPC circuit switching signal based on the three-phase bridge arm modulation wave and obtaining a three-phase bridge arm NPC circuit output voltage based on the three-phase bridge arm NPC circuit switching signal include the following operations:

The obtaining a three-phase bridge arm NPC circuit switching signal based on the three-phase bridge arm modulation wave includes:

$$S_{x1} = \begin{cases} 0 & u_x^*(t) < \frac{U_{dc}}{4} \\ 1 & u_x^*(t) \geq \frac{U_{dc}}{4} \end{cases}$$

$$S_{x2} = \begin{cases} 0 & u_x^*(t) > -\frac{U_{dc}}{4} \\ -1 & u_x^*(t) \leq -\frac{U_{dc}}{4} \end{cases}$$

wherein, $U_{dc}$ represents a reference value of a DC-side voltage of the NPC circuit, $S_{x1}$ and $S_{x2}$ represent switching functions of an upper bridge arm and a lower bridge arm of an $x^{th}$-phase NPC circuit respectively; and $u_x^*(t)$ represents a modulation wave of an $x^{th}$-phase bridge arm.

The obtaining a three-phase bridge arm NPC circuit output voltage based on the three-phase bridge arm NPC circuit switching signal includes:

$$u_{npcx}(t) = \frac{U_{dc}}{2}(S_{x1} + S_{x2})$$

wherein, $u_{npcx}(t)$ represents an output voltage of the $x^{th}$-phase NPC circuit.

Preferably, the obtaining a fourth bridge arm NPC circuit switching signal based on the fourth bridge arm modulation wave and obtaining a fourth bridge arm NPC circuit output voltage based on the fourth bridge arm NPC circuit switching signal include the following operations:

The obtaining a fourth bridge arm NPC circuit switching signal based on the fourth bridge arm modulation wave includes:

using the following relation to represent switching angles of the fourth bridge arm NPC circuit within a unit period of the modulation wave of the fourth bridge arm, denoted as $\theta_1$ to $\theta_4$:

$$\begin{cases} \theta_1 \in [0, \pi/2) \\ \theta_2 = \pi - \theta_1 \\ \theta_3 = \pi + \theta_1 \\ \theta_4 = 2\pi - \theta_1 \end{cases}$$

Therefore, the following relation is used to represent a calculation formula of an output voltage $u_{npc0}(t)$ of the fourth bridge arm NPC circuit:

$$u_{npc0}(t) = \frac{U_{dc}}{2}(S_{01} + S_{02})$$

wherein, $S_{01}$ and $S_{02}$ are switching functions an upper bridge arm and a lower bridge arm of the fourth bridge arm NPC circuit respectively, and are represented by the following relation:

$$S_{01} = \begin{cases} 0 & t \in [0, \frac{\theta_1}{\omega}) \cup (\frac{\theta_1}{\omega}, \frac{2\pi}{\omega}] \\ 1 & t \in [\frac{\theta_1}{\omega}, \frac{\theta_2}{\omega}] \end{cases}$$

$$S_{01} = \begin{cases} 0 & t \in [0, \frac{\theta_3}{\omega}) \cup (\frac{\theta_4}{\omega}, \frac{2\pi}{\omega}] \\ -1 & t \in [\frac{\theta_3}{\omega}, \frac{\theta_4}{\omega}] \end{cases}$$

wherein, $\omega=2\pi/T$, where T is a grid voltage cycle.

It is assumed that a time domain expression $u^*_{0r}(t)$ of the modulation wave of the fourth bridge arm and a fault compensation current $i^*_{z0}(t)$ of the fourth bridge arm respectively are:

$$\begin{cases} u^*_{0r}(t) = U_m \sin\omega t \\ i^*_{z0}(t) = I_m \sin(\omega t + \varphi) \end{cases}$$

wherein, $U_m$ and $I_m$ a modulation voltage amplitude and a compensation current amplitude respectively, and $\varphi$ is a power factor angle.

The following relation is used to represent energy fluctuation $\Delta E$ of the fourth bridge arm CHB circuit in a unit period:

$$\Delta E = \int_0^T u^*_{chb0}(t) i^*_{z0}(t) dt =$$

$$\int_0^T [u^*_{0r}(t) - u^*_{npc0}(t)] i^*_{z0}(t) dt = \frac{I_m \cos\varphi[\pi U_m - 2U_{dc}\cos(\theta_1)]}{\omega}$$

wherein, $u^*_{chb0}(t)$ represents a modulation voltage of the fourth bridge arm CHB circuit.

When energy fluctuates by $\Delta E=0$ within a unit period, a capacitor voltage of a CHB circuit submodule is stable, and therefore, when the capacitor voltage of the CHB circuit submodule is stable, the switching angle $\theta_1$ is represented by the following relation:

$$\theta_1 = \arccos\left(\frac{\pi U_m}{2U_{dc}}\right)$$

Therefore, the switching functions $S_{01}$ and $S_{02}$ of the upper bridge arm and the lower bridge arm of the fourth bridge arm NPC circuit are rectified as $S_{001}$ and $S_{002}$ respectively:

$$S_{001} = \begin{cases} 0 & u^*_0(t) < U_m \sin\theta_1 \\ 1 & u^*_0(t) \geq U_m \sin\theta_1 \end{cases}$$

$$S_{002} = \begin{cases} 0 & u^*_0(t) < -U_m \sin\theta_1 \\ 1 & u^*_0(t) \geq -U_m \sin\theta_1 \end{cases}$$

The fourth bridge arm NPC circuit switching signal is obtained based on $S_{001}$ and $S_{002}$ and the fourth bridge arm modulation wave.

The obtaining a fourth bridge arm NPC circuit output voltage $u_{npc_0}(t)$ based on the fourth bridge arm NPC circuit switching signal includes:

$$u_{npc_0}(t) = \frac{U_{dc}}{2}(S_{001} + S_{002})$$

Preferably, the performing feedback closed-loop control on a capacitor voltage of each submodule of the CHB circuit separately to obtain a voltage-stabilizing active vector of each submodule of the CHB circuit includes:

$$\Delta v_{xj} = -K_{pd}(U^*_c - U_{cxj})\sin(\omega t + \varphi_x)$$

wherein, $\Delta v_{xj}$ represents a voltage-stabilizing active vector of a $j^{th}$ CHB circuit submodule of the $x^{th}$ phase; $U_{cxj}$ represents a capacitor voltage of the $j^{th}$ CHB circuit submodule of the $x^{th}$ phase; $U^*_c$ represents a reference value of the capacitor voltage of the CHB circuit submodule; and $\varphi_x$ represents a phase of the output current of the $x^{th}$ phase.

The obtaining a three-phase bridge arm CHB circuit switching signal based on the three-phase bridge arm modulation wave, the three-phase bridge arm NPC circuit output voltage, and the voltage-stabilizing active vector of each submodule of the CHB circuit includes:

calculating a modulation voltage $u^*_{chbx}(t)$ of an $x^{th}$-phase CHB circuit, where (t) the voltage of each phase in the three-phase bridge arm is calculated by a same method, and is represented by the following relation:

$$u^*_{chbx}(t) = u^*_x(t) - u_{npcx}(t)$$

wherein, $u^*_x(t)$ represents a bridge arm modulation wave of the $x^{th}$ phase, and $u_{npcx}(t)$ represents an NPC circuit output voltage of the $x^{th}$ phase;

calculating the CHB circuit submodule switching function based on the modulation voltage $u^*_{chbx}(t)$ of the $x^{th}$-phase CHB circuit to obtain an $x^{th}$-phase CHB circuit switching signal represented by the following relation:

$$S_{xj} = \begin{cases} 0 & u^*_{chbx}(t) < u_{trj} \\ 1 & u^*_{chbx}(t) \geq u_{trj} \end{cases}$$

wherein, $S_{xj}$ (j=1, 2, ..., N) represents a switching function of an $x^{th}$-phase CHB circuit submodule, and $u_{trj}$ is a modulation carrier of a $j^{th}$ CHB unit submodule and corresponds to a phase π/N.

The obtaining a fourth bridge arm CHB circuit switching signal based on the fourth bridge arm modulation wave, the fourth bridge arm NPC circuit output voltage, and the voltage-stabilizing active vector of each submodule of the CHB circuit includes:

calculating the modulation voltage $u^*_{chb0}(t)$ of the fourth bridge arm CHB circuit, represented by the following relation:

$$u^*_{chb0}(t) = u^*_0(t) - u_{npc0}(t)$$

calculating the CHB circuit submodule switching function based on the modulation voltage $u^*_{chb0}(t)$ of the fourth bridge arm CHB circuit to obtain a fourth bridge arm CHB circuit switching signal, represented by the following relation:

$$S_{0j} = \begin{cases} 0 & u^*_{chb0}(t) < u_{trj} \\ 1 & u^*_{chb0}(t) \geq u_{trj} \end{cases}$$

wherein, $S_{0j}$ (j=1, 2, ..., N) represents a switching function of the fourth bridge arm CHB circuit submodule, and $u_{trj}$ is the modulation carrier of the $j^{th}$ CHB unit submodule and corresponds to a phase T/N.

The present disclosure achieves at least the following beneficial effects:

The adaptive control method for the fault control-oriented economically-integrated medium-voltage grid-connected device with the SiC module according to the present disclosure obtains the switching signals of the three-phase bridge arm NPC circuit and the CHB circuit by acquiring the device data and performing mathematical operations, so that the present disclosure can implement the reactive compensation function through the switching signals of the three-phase bridge arm NPC circuit and the CHB circuit in both a normal mode and a faulty mode of the distribution network. The switching signal of the fourth bridge arm NPC circuit is also obtained by acquiring the device data and performing mathematical operations. In this way, the present disclosure can ensure the stability of the capacitor voltage of the fourth bridge arm CHB circuit submodule through the switching signals of the fourth bridge arm NPC circuit and the CHB circuit, thereby ensuring the self-stabilization of the DC side of the IFCD; and can implement high-quality control of single-phase grounding faults in the faulty mode of the distribution network. The method of the present disclosure effectively solves the problem of the contradiction between the voltage stabilization objective and the arc suppression control objective of the grid-connected device in the SPG period, without the need to add a power supply device to the fourth bridge arm, thereby improving the power density and cost-effectiveness of the device.

The present disclosure also achieves other objectives, features, and advantages in addition to the objectives, features, and advantages described above. The following describes the present disclosure in further detail with reference to accompanying drawings.

BRIEF DESCRIPTION OF THE DRAWINGS

The drawings that constitute a part of the present disclosure are intended to enable a further understanding of the present disclosure. The exemplary embodiments of the present disclosure and the description thereof are intended to explain the present disclosure but without constituting any undue limitation on the present disclosure. In the drawings.

DETAILED DESCRIPTION OF THE EMBODIMENTS

The embodiments of the present disclosure are described in detail below with reference to accompanying drawings, but the present disclosure may be implemented in many different ways as defined and covered by the claims.

Figure 1:
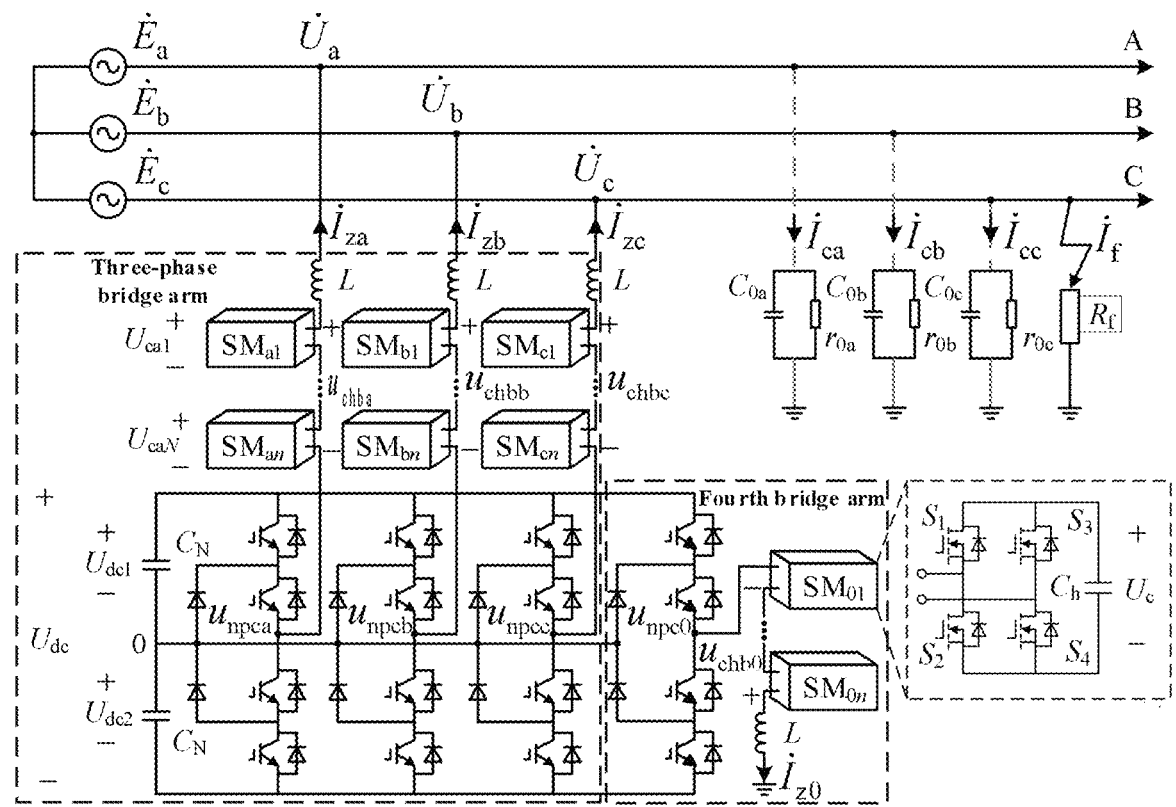
FIG. 1 is a schematic structural diagram of a grid-connected device according to a preferred embodiment of the present disclosure.

Referring to FIG. 1, a fault control-oriented economically-integrated medium-voltage grid-connected device with a SiC module according to the present disclosure includes a first bridge arm, a second bridge arm, a third bridge arm, and a fourth bridge arm. Any one of the bridge arms includes a CHB circuit and an NPC circuit connected in series. The CHB circuit termination end of the fourth bridge arm is grounded. The CHB circuit termination ends of the first bridge arm, the second bridge arm, and the third bridge arm are connected to a three-phase distribution network.

The CHB circuit includes N submodules connected in series, where N is a positive integer. Each submodule is formed of 4 fully-controlled SiC MOSFET devices, named $S_1$, $S_2$, $S_3$, and $S_4$ in sequence. The collectors of $S_1$ and $S_3$ are connected to a positive electrode of the submodule capacitor separately; and the emitters are connected to a first lead-out terminal separately. The emitters of $S_2$ and $S_4$ are connected to a negative electrode of the submodule capacitor separately; and the collectors are connected to a second lead-out terminal. The first lead-out terminal of the submodule close to the distribution network in the CHB circuits of the first bridge arm, the second bridge arm, and the third bridge arm is attached to the distribution network after passing through a filter inductor L. The second lead-out terminal of the submodule close to the NPC circuit is connected to the output end of the NPC circuit of the first bridge arm, the second bridge arm, and the third bridge arm. The first lead-out terminal of the submodule close to the NPC circuit in the fourth bridge arm CHB circuit is connected to the output end of the fourth bridge arm NPC circuit. The remaining first lead-out terminals and second lead-out terminals are configured to connect the submodules end to end.

The NPC circuit includes a first clamping diode, a second clamping diode, and four fully controlled SiC MOSFET devices. The four fully controlled SiC MOSFET devices are connected in series. The collector of the first SiC MOSFET device is connected to the positive electrode of the NPC DC capacitor. The emitter of the fourth SiC MOSFET device is connected to the negative electrode of the NPC DC capacitor. The NPC circuits of the first bridge arm, the second bridge arm, the third bridge arm, and the fourth bridge arm all share the same NPC DC capacitor. The anode of the first clamping diode is connected to the emitter of the first SiC MOSFET device, and the cathode of the first clamping diode is connected to the neutral point of the NPC circuit. The anode of the second clamping diode is connected to the neutral point of the NPC circuit, and the cathode of the second clamping diode is connected to the collector of the fourth SiC MOSFET device. The output end of the NPC circuit is located between the emitter of the second SiC MOSFET device and the collector of the third SiC MOSFET device.

Referring to FIG. 1, for a medium-voltage distribution network, $\dot{E}_x$ (x=a, b, c) is a grid phase voltage; $\dot{U}_x$ (x=a, b, c) is a grid connection point voltage, $C_{0x}$ (x=a, b, c) is a line capacitance-to-ground; $r_{0x}$ (x=a, b, c) is a line resistance-to-ground; and $R_f$ is a grounding fault resistance. For HCM-IFCD, $u_{npcx}$ (x=a, b, c, 0) is an NPC circuit output voltage; $u_{chbx}$ (x=a, b, c, 0) is a CHB circuit output voltage; $U_{dc1}$ and $U_{dc2}$ are DC-side voltages of the NPC circuit; $\dot{I}_{zx}$ (x=a, b, c, 0) is an output current of each bridge; CN is a DC capacitor of the NPC circuit; Ch is a DC capacitor of the CHB circuit; L is a filter inductance; and A, B, and C represent three phases of the distribution network respectively.

Figure 2:
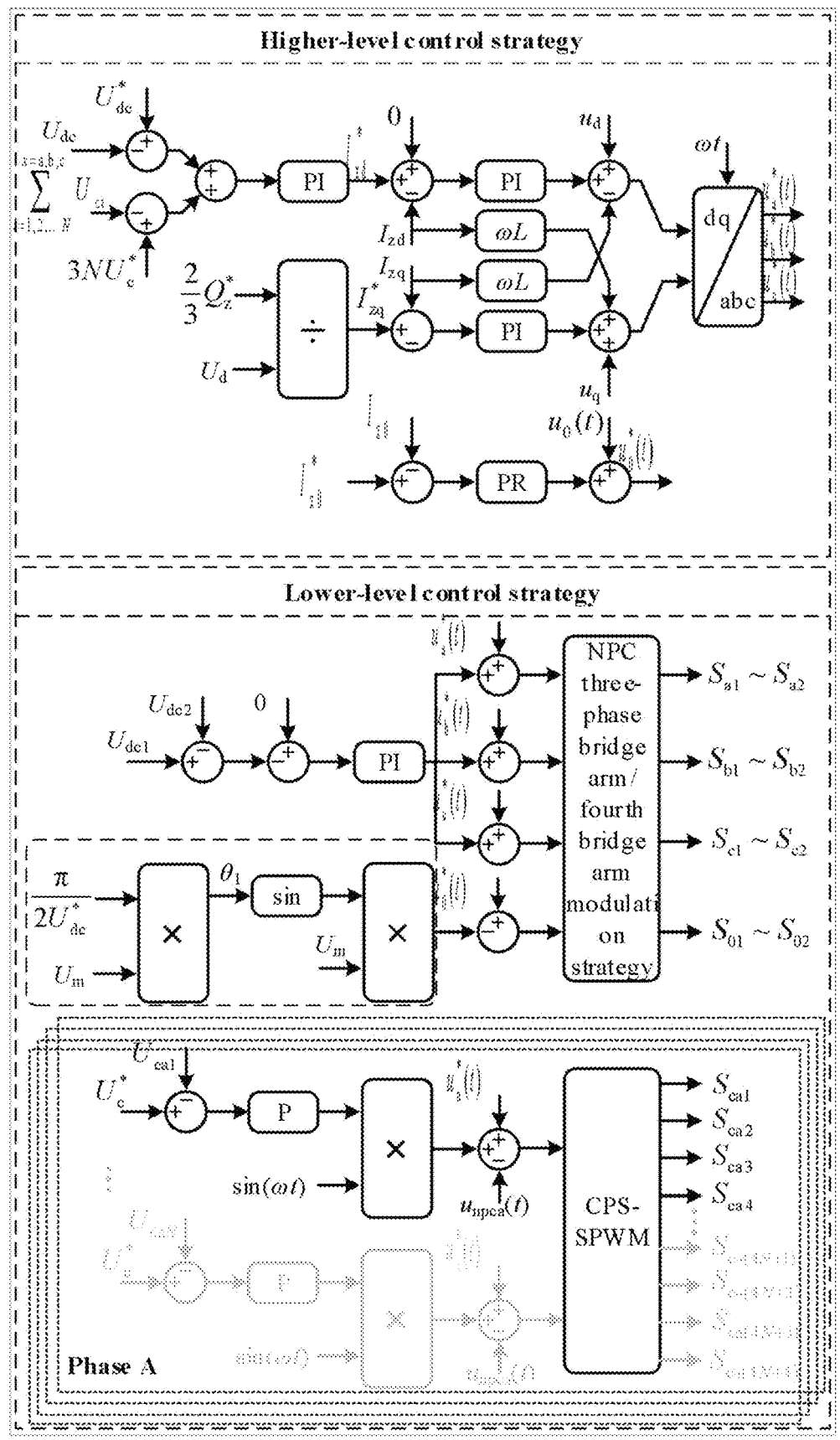
FIG. 2 is a control block diagram of a control method according to a preferred embodiment of the present disclosure.

Referring to FIG. 2, a preferred embodiment of the present disclosure provides an adaptive control method for a fault control-oriented economically-integrated medium-voltage grid-connected device with a SiC module, including: a higher-level control strategy and a lower-level control strategy.

Higher-Level Control Strategy:

A DC-side voltage of an NPC circuit is obtained to obtain a first voltage. A sum of capacitor voltages of CHB circuit submodules is obtained to obtain a second voltage. The first voltage and the second voltage are subtracted from a third voltage to obtain a first difference. The third voltage includes a sum of a preset reference value of the DC-side voltage of the NPC circuit and a preset reference value of the sum of the capacitor voltages of the CHB circuit submodules.

The first difference is subjected to feedback closed-loop control to obtain a voltage-stabilizing active current reference value.

A reference value of a reactive compensation current is obtained based on a preset reactive compensation instruction, which specifically includes the following operation:

The preset reactive compensation instruction is issued by a higher-level dispatch system, denoted as $Q^*_z$.

Therefore, the reference value of the reactive compensation current $I^*_{zq}$ is denoted by the following relation:

$$I^*_{zq} = \frac{2Q^*_z}{3U_d}$$

wherein, $U_d$ is an active vector of a grid voltage.

A sample value of the voltage-stabilizing active current and a sample value of the reactive compensation current of a three-phase bridge arm are obtained, and the sample value is subtracted from the reference value of the voltage-stabilizing active current and the reference value of the reactive compensation current to obtain a second difference and a third difference, respectively.

Feedback closed-loop decoupling control is performed on the second difference and the third difference to obtain a three-phase bridge arm modulation wave, which specifically includes:

$$\begin{cases} V_d = -(K_{pi} + K_{ii}/s)(I^*_{zd} - I_{zd}) + \omega L I_{zq} + U_d \\ V_q = -(K_{pi} + K_{ii}/s)(I^*_{zd} - I_{zd}) + \omega L I_{zq} + U_q \end{cases}$$

$$\begin{bmatrix} u^*_a(t) \\ u^*_b(t) \\ u^*_c(t) \end{bmatrix} = \begin{bmatrix} \cos\theta & -\sin\theta & 1 \\ \cos(\theta - 120°) & -\sin(\theta - 120°) & 1 \\ \cos(\theta + 120°) & -\sin(\theta + 120°) & 1 \end{bmatrix} \begin{bmatrix} V_d \\ V_q \\ 0 \end{bmatrix}$$

wherein, $u^*_a(t)$, $u^*_b(t)$, and $u^*_c(t)$ are three-phase bridge arm modulation waves; $\theta$ is an angle between a d-axis and a phase reference axis; $\omega$ is an angular frequency of a power grid; and L is a filter inductance value; $V_d$ represents the d-axis component of the three-phase bridge arm modulation wave; $V_q$ represents a q-axis component of the three-phase bridge arm modulation wave; $U_q$ represents a reactive vector of the grid voltage; $K_{pi}$ represents a proportional coefficient of a PI controller; $K_{ii}$ represents an integral coefficient of the PI controller; $I^*_{zd}$ represents the reference value of the voltage-stabilizing active current; $I_{zd}$ represents the sample value of the voltage-stabilizing active current; $I_{zq}$ represents the sample value of the reactive compensation current; s represents a variable in a complex frequency domain.

A reference value of an output current of a fourth bridge arm is calculated based on distribution network information, which specifically includes the following operations:

The following relation is used to represent the reference value of the output current $I^*_{z0}$ of the fourth bridge arm when a single-phase grounding fault occurs on phase x:

$$I^*_{z0} = (\dot{E}_y - \dot{E}_x)(1/r_{0y} + j\omega C_{0y}) + (\dot{E}_w - \dot{E}_x)(1/r_{0w} + j\omega C_{0w})$$

wherein, Ė$_x$ is an x-phase power-grid phase voltage; Ė$_y$ and Ė$_w$ are power-grid phase voltages of remaining two phases other than the x-phase; r$_{0y}$ and r$_{0w}$ are resistances-to-ground of the remaining two phases other than the x-phase; and C$_{0y}$ and C$_{0w}$ are capacitances-to-ground of the remaining two phases other than the x-phase; j represents an imaginary unit of a complex number.

A sample value of the output current of the fourth bridge arm is obtained, the sample value is subtracted from the reference value of the output current of the fourth bridge arm to obtain a fourth difference, feedback closed-loop control is performed on the fourth difference, and feedforward control is performed on an output voltage of the fourth bridge arm additionally to obtain a fourth bridge arm modulation wave, which specifically includes:

$$u_0^*(t) = \left(K_p + \frac{2K_r \omega_c s}{s^2 + 2\omega_c s + \omega_0^2}\right)(I_{z0}^* - I_{z0}) + u_0(t)$$

wherein, u*$_0$(t) is the modulation wave of the fourth bridge arm; K$_p$ and K$_r$ are a proportional coefficient and an integral coefficient of a PR controller respectively; $\omega_c$ is a resonant frequency band width; $\omega_0$ is a resonant frequency point; I$_{z0}$ is an output current of the fourth bridge arm; and u$_0$(t) is an output voltage of the fourth bridge arm.

Lower-Level Control Strategy:

A three-phase bridge arm NPC circuit switching signal is obtained based on the three-phase bridge arm modulation wave and a three-phase bridge arm NPC circuit output voltage is obtained based on the three-phase bridge arm NPC circuit switching signal, which specifically includes the following operations:

A three-phase bridge arm NPC circuit switching signal by a nearest level approximation modulation method is obtained based on the three-phase bridge arm modulation wave, which includes:

$$S_{x1} = \begin{cases} 0 & u_x^*(t) < \frac{U_{dc}}{4} \\ 1 & u_x^*(t) \geq \frac{U_{dc}}{4} \end{cases}$$

$$S_{x2} = \begin{cases} 0 & u_x^*(t) > -\frac{U_{dc}}{4} \\ -1 & u_x^*(t) \leq -\frac{U_{dc}}{4} \end{cases}$$

wherein, U$_{dc}$ represents a reference value of a DC-side voltage of the NPC circuit, S$_{x1}$ and S$_{x2}$ represent switching functions of an upper bridge arm and a lower bridge arm of an x$^{th}$-phase NPC circuit respectively; and u*$_x$(t) represents a modulation wave of an x$^{th}$-phase bridge arm.

In order to prevent the DC-side capacitor from being damaged by the neutral-point potential fluctuation of the NPC circuit, a zero-sequence voltage injection method is employed to ensure a voltage balance between DC split capacitors, thereby implementing a neutral-point potential balance of the NPC circuit. In other words, the voltage of the first DC capacitor of the NPC circuit is subtracted from the voltage of the second DC capacitor of the NPC circuit to obtain a difference, the reference value 0 is subtracted from this difference to obtain another difference, and this difference is subjected to feedback closed-loop control to obtain the zero-sequence voltage that needs to be injected. This zero-sequence voltage is superimposed on the modulation wave of the three-phase bridge arm to implement a balance of the neutral-point voltage on the NPC DC side.

A three-phase bridge arm NPC circuit output voltage is obtained based on the three-phase bridge arm NPC circuit switching signal, which includes:

$$u_{npcx}(t) = \frac{U_{dc}}{2}(S_{x1} + S_{x2})$$

wherein, u$_{npcx}$(t) represents an output voltage of the x$^{th}$-phase NPC circuit.

A fourth bridge arm NPC circuit switching signal is obtained based on the fourth bridge arm modulation wave and a fourth bridge arm NPC circuit output voltage is obtained based on the fourth bridge arm NPC circuit switching signal, which specifically includes the following operations:

A fourth bridge arm NPC circuit switching signal is obtained based on the fourth bridge arm modulation wave, which includes the following operations:

The following relation is used to represent switching angles of the fourth bridge arm NPC circuit within a unit period of the modulation wave of the fourth bridge arm, denoted as $\theta_1$ to $\theta_4$:

$$\begin{cases} \theta_1 \in [0, \pi/2) \\ \theta_2 = \pi - \theta_1 \\ \theta_2 = \pi + \theta_1 \\ \theta_4 = 2\pi - \theta_1 \end{cases}$$

Therefore, using the following relation to represent a calculation formula of an output voltage u$_{npc0}$(t) of the fourth bridge arm NPC circuit:

$$u_{npc0}^*(t) = \frac{U_{dc}}{2}(S_{01} + S_{02})$$

wherein, S$_{01}$ and S$_{02}$ are switching functions an upper bridge arm and a lower bridge arm of the fourth bridge arm NPC circuit respectively, and are represented by the following relation:

$$S_{01} = \begin{cases} 0 & t \in \left[0, \frac{\theta_1}{\omega}\right) \cup \left(\frac{\theta_1}{\omega}, \frac{2\pi}{\omega}\right] \\ 1 & t \in \left[\frac{\theta_1}{\omega}, \frac{\theta_2}{\omega}\right] \end{cases}$$

$$S_{02} = \begin{cases} 0 & t \in \left[0, \frac{\theta_3}{\omega}\right) \cup \left(\frac{\theta_4}{\omega}, \frac{2\pi}{\omega}\right] \\ -1 & t \in \left[\frac{\theta_3}{\omega}, \frac{\theta_4}{\omega}\right] \end{cases}$$

wherein, $\omega=2\pi/T$, where T is a grid voltage cycle.

It is assumed that a time domain expression u*$_0$(t) of the modulation wave of the fourth bridge arm and a fault compensation current i*$_{z0}$(t) of the fourth bridge arm respectively are:

$$\begin{cases} u_{0t}^*(t) = U_m \sin \omega t \\ i_{z0}^*(t) = I_m \sin(\omega t + \varphi) \end{cases}$$

wherein, $U_m$ and $I_m$ a modulation voltage amplitude and a compensation current amplitude respectively, and $\varphi$ is a power factor angle.

The following relation is used for representing energy fluctuation $\Delta E$ of the fourth bridge arm CHB circuit in a unit period:

$$\Delta E = \int_0^T u^*_{chb0}(t) i^*_{z0}(t) dt = \int_0^T [u^*_{0r}(t) - u^*_{npc0}(t)] i^*_{z0}(t) dt$$

$$= \frac{I_m \cos\varphi[\pi U_m - 2U_{dc}\cos(\theta_1)]}{\omega}$$

wherein, $u^*_{chb0}(t)$ represents a modulation voltage of the fourth bridge arm CHB circuit.

When energy fluctuates by $\Delta E=0$ within a unit period, a capacitor voltage of a CHB circuit submodule is stable, and therefore, when the capacitor voltage of the CHB circuit submodule is stable, the switching angle $\theta_1$ is represented by the following relation:

$$\theta_1 = \arccos\left(\frac{\pi U_m}{2U_{dc}}\right)$$

Therefore, the switching functions $S_{O1}$ and $S_{O2}$ of the upper bridge arm and the lower bridge arm of the fourth bridge arm NPC circuit are rectified as $S_{O01}$ and $S_{O02}$ respectively:

$$S_{O01} = \begin{cases} 0 & u^*_0(t) < U_m \sin\theta_1 \\ 1 & u^*_0(t) \geq U_m \sin\theta_1 \end{cases}$$

$$S_{O02} = \begin{cases} 0 & u^*_0(t) < -U_m \sin\theta_1 \\ 1 & u^*_0(t) \geq -U_m \sin\theta_1 \end{cases}$$

The fourth bridge arm NPC circuit switching signal is obtained based on $S_{O01}$ and $S_{O02}$ and the fourth bridge arm modulation wave.

A fourth bridge arm NPC circuit output voltage $u_{npc0}(t)$ is obtained based on the fourth bridge arm NPC circuit switching signal, which includes:

$$u_{npc0}(t) = \frac{U_{dc}}{2}(S_{O01} + S_{O02})$$

Feedback closed-loop control is performed on a capacitor voltage of each submodule of the CHB circuit to obtain a voltage-stabilizing active vector of each submodule of the CHB circuit, which specifically includes:

$$\Delta v_{xj} = -K_{pd}(U^*_c - U_{cxj})\sin(\omega t + \varphi_x)$$

wherein, $\Delta V_{xj}$ represents a voltage-stabilizing active vector of a $j^{th}$ CHB circuit submodule of the $x^{th}$ phase; $U_{cxj}$ represents a capacitor voltage of the $j^{th}$ CHB circuit submodule of the $x^{th}$ phase; $U^*_c$ represents a reference value of the capacitor voltage of the CHB circuit submodule; and $\varphi_x$ represents a phase of the output current of the $x^{th}$ phase.

A three-phase bridge arm CHB circuit switching signal is obtained based on the three-phase bridge arm modulation wave, the three-phase bridge arm NPC circuit output voltage, and the voltage-stabilizing active vector of each submodule of the CHB circuit, with the CHB circuit switching signal modulation method being a PWM modulation method, which specifically includes the following operations:

The modulation voltage $u^*_{chbx}(t)$ of an $x^{th}$-phase CHB circuit is calculated. The voltage of each phase in the three-phase bridge arm is calculated by a same method, and is represented by the following relation:

$$u^*_{chbx}(t) = u^*_x(t) - u_{npcx}(t)$$

wherein, $u^*_x(t)$ represents a bridge arm modulation wave of the $x^{th}$ phase, and $u_{npcx}(t)$ represents an NPC circuit output voltage of the $x^{th}$ phase.

The CHB circuit submodule switching function is calculated based on the modulation voltage $u^*_{chbx}(t)$ of the $x^{th}$-phase CHB circuit to obtain an $x^{th}$-phase CHB circuit switching signal represented by the following relation:

$$S_{xj} = \begin{cases} 0 & u^*_{chbx}(t) < u_{trj} \\ 1 & u^*_{chbx}(t) \geq u_{trj} \end{cases}$$

wherein, $S_{xj}$ (j=1, 2, . . . , N) represents a switching function of an $x^{th}$-phase CHB circuit submodule, and $u_{trj}$ is a modulation carrier of a $j^{th}$ CHB unit submodule and corresponds to a phase $\pi/N$.

A fourth bridge arm CHB circuit switching signal is obtained based on the fourth bridge arm modulation wave, the fourth bridge arm NPC circuit output voltage, and the voltage-stabilizing active vector of each submodule of the CHB circuit, with the CHB circuit switching signal modulation method being a PWM modulation method, which specifically includes the following operation:

A modulation voltage $u^*_{chb0}(t)$ of the fourth bridge arm CHB circuit is calculated, represented by the following relation:

$$u^*_{chb0}(t) = u^*_0(t) - u_{npc0}(t)$$

The CHB circuit submodule switching function is calculated based on the modulation voltage $u^*_{chb0}(t)$ of the fourth bridge arm CHB circuit to obtain a fourth bridge arm CHB circuit switching signal, represented by the following relation:

$$S_{0j} = \begin{cases} 0 & u^*_{chb0}(t) < u_{trj} \\ 1 & u^*_{chb0}(t) \geq u_{trj} \end{cases}$$

In the above relation, $S_{0j}$ (j=1, 2, . . . , N) represents a switching function of the fourth bridge arm CHB circuit submodule, and $u_{trj}$ is the modulation carrier of the $j^{th}$ CHB unit submodule and corresponds to a phase $\pi/N$.

Adaptive control is performed on the grid-connected device based on the three-phase bridge arm CHB circuit switching signal and the fourth bridge arm CHB circuit switching signal.

Verification Part

In order to verify the effectiveness of the adaptive control method for a fault control-oriented economically-integrated medium-voltage grid-connected device with a SiC module, the following operating conditions are set: at the $1^{th}$ second, a single-phase grounding fault occurs in phase A; in the period from the $1^{th}$ second to the $1.1^{th}$ second, the HCM-IFCD still operates in a reactive power compensation mode; and at the $1.1^{th}$ second, the HCM-IFCD performs fault control. The simulated waveform of the HCM-IFCD fault control is shown in FIG. 3 to FIG. 7.

Figure 3:
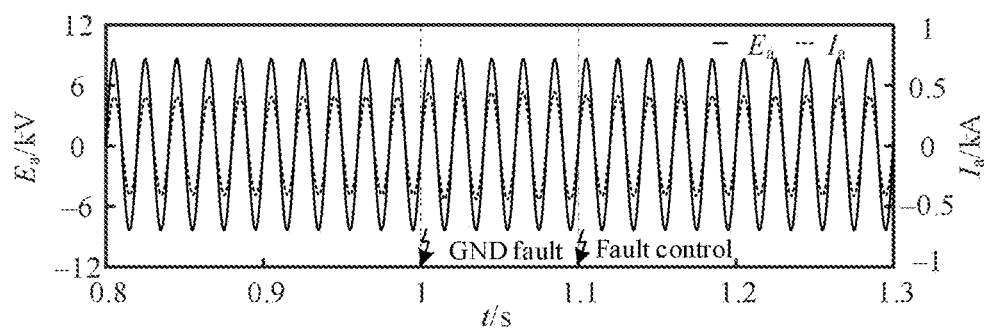
FIG. 3 is a simulated waveform diagram of a phase voltage and a phase current of a power grid according to a preferred embodiment of the present disclosure.
Figure 4:
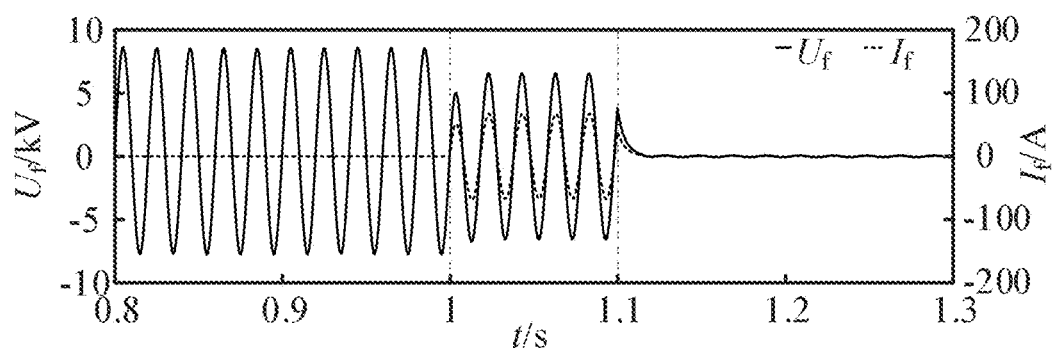
FIG. 4 is a simulated waveform diagram of a faulty voltage and a faulty current according to a preferred embodiment of the present disclosure.
Figure 5:
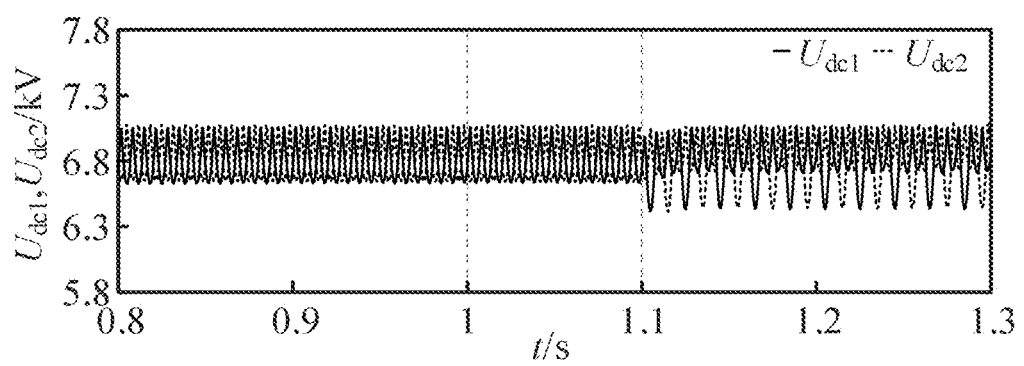
FIG. 5 is a simulated waveform diagram of a DC capacitor voltage of an NPC circuit according to a preferred embodiment of the present disclosure.
Figure 6:
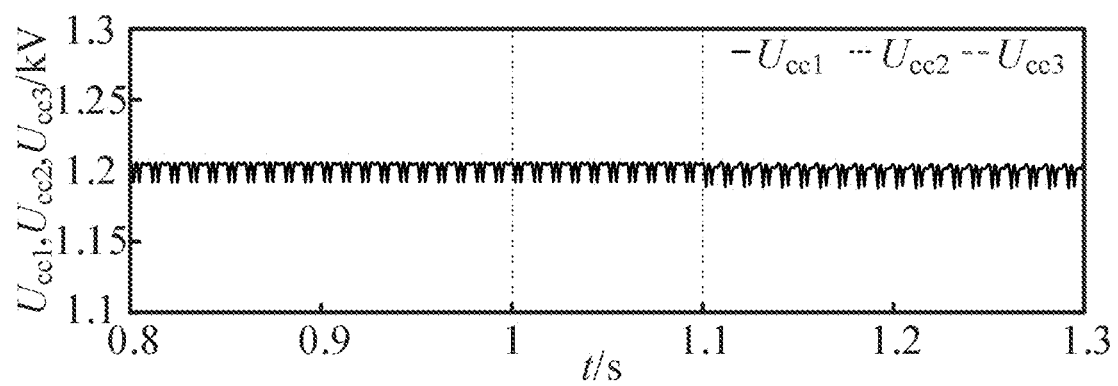
FIG. 6 is a simulated waveform diagram of a capacitor voltage of a C-phase CHB circuit submodule according to a preferred embodiment of the present disclosure.
Figure 7:
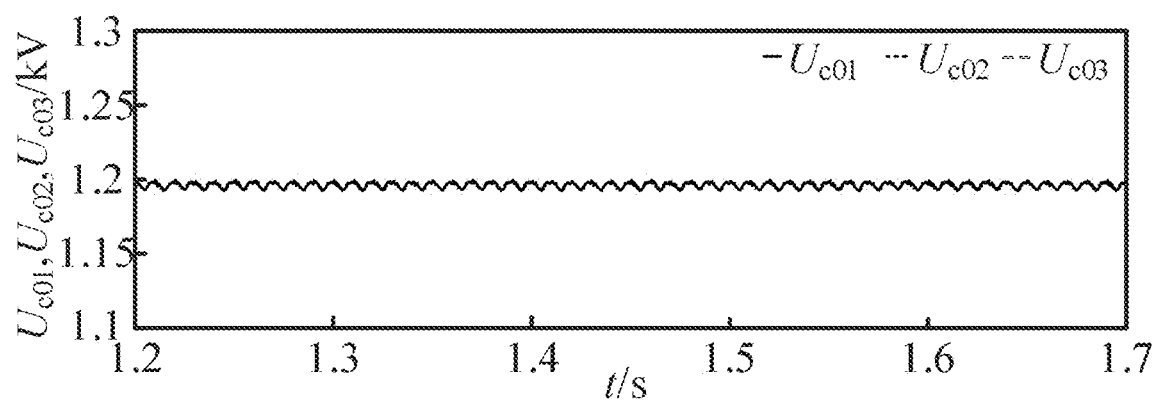
FIG. 7 is a simulated waveform diagram of a capacitor voltage of a fourth bridge arm CHB circuit submodule according to a preferred embodiment of the present disclosure.

As shown in FIG. 3, during fault control, the HCM-IFCD can provide reactive support for the power grid. Before and after the fault occurs, the power supply side of the power grid always keeps operating at a unity power factor. As shown in FIG. 4, when HCM-IFCD performs no arc suppression, the residual current $I_f$ at the fault point reaches 65.49 A, and the residual voltage $U_f$ at the fault point reaches 6550.99 V, thereby posing a severe threat to the safe and reliable operation of the distribution network. After the HCM-IFCD performs fault control, an arc suppression current $I_{z0}$ is injected through the fourth bridge arm. The residual current $I_f$ of the faulty current is suppressed to 0.71 A, and the residual voltage at the fault point is suppressed to 65 V, thereby effectively suppressing the single-phase grounding fault. As shown in FIG. 5, in the fault control mode, the DC-side voltages $U_{dc1}$ and $U_{dc2}$ of the NPC circuit both fluctuate around the reference value of 6800 V. As shown in FIG. 6, using phase C as an example, the DC-side voltages $U_{c1}$ to $U_{c3}$ of the three-phase bridge arm of the CHB circuit fluctuate around the reference value of 1200 V. As shown in FIG. 7, the DC-side voltages $U_{o1}$ to $U_{o3}$ of the CHB circuit of the fourth bridge arm fluctuate around the reference value of 1200 V.

The simulation results show that the adaptive control method for a fault control-oriented economically-integrated medium-voltage grid-connected device with a SiC module according to the present disclosure implements self-stabilization of voltage of the four-arm HCM-IFCD, and effectively solves the problem of the contradiction between the voltage stabilization objective and the arc suppression control objective of the grid-connected device in the SPG period, without the need to add a power supply device to the fourth bridge arm, thereby improving the power density and cost-effectiveness of the device.

To sum up, the adaptive control method for a fault control-oriented economically-integrated medium-voltage grid-connected device with a SiC module according to the present disclosure obtains the switching signals of the three-phase bridge arm NPC circuit and the CHB circuit by acquiring the device data and performing mathematical operations, so that the present disclosure can implement the reactive compensation function through the switching signals of the three-phase bridge arm NPC circuit and the CHB circuit in both a normal mode and a faulty mode of the distribution network. The switching signal of the fourth bridge arm NPC circuit is also obtained by acquiring the device data and performing mathematical operations. In this way, the present disclosure can ensure the stability of the capacitor voltage of the fourth bridge arm CHB circuit submodule through the switching signals of the fourth bridge arm NPC circuit and the CHB circuit, thereby ensuring the self-stabilization of the DC side of the IFCD; and can implement high-quality control of single-phase grounding faults in the faulty mode of the distribution network. The method of the present disclosure effectively solves the problem of the contradiction between the voltage stabilization objective and the arc suppression control objective of the grid-connected device in the SPG period, without the need to add a power supply device to the fourth bridge arm, thereby improving the power density and cost-effectiveness of the device.

What is described above is merely exemplary embodiments of the present disclosure, but is not intended to limit the present disclosure. To a person skilled in the art, various modifications and variations may be made to the present disclosure. Any and all modifications, equivalent replacements, improvements, and the like made without departing from the essence and principles of the present disclosure still fall within the protection scope of the present disclosure.

What is claimed is:

1. An adaptive control method for a fault control-oriented economically-integrated medium-voltage grid-connected device with a silicon carbide (SiC) module, comprising:

obtaining a direct current (DC)-side voltage of a neutral point clamped (NPC) circuit to obtain a first voltage; obtaining a sum of capacitor voltages of cascaded H-bridge (CHB) circuit submodules to obtain a second voltage; and subtracting the first voltage and the second voltage from a third voltage to obtain a first difference, wherein the third voltage comprises a sum of a preset reference value of the DC-side voltage of the NPC circuit and a preset reference value of the sum of the capacitor voltages of the CHB circuit submodules;

performing feedback closed-loop control on the first difference to obtain a reference value of a voltage-stabilizing active current; obtaining a reference value of a reactive compensation current based on a preset reactive compensation instruction; obtaining a sample value of the voltage-stabilizing active current and a sample value of the reactive compensation current of a three-phase bridge arm, and subtracting the sample values from the reference value of the voltage-stabilizing active current and the reference value of the reactive compensation current to obtain a second difference and a third difference, respectively; and performing feedback closed-loop decoupling control on the second difference and the third difference to obtain a three-phase bridge arm modulation wave;

calculating a reference value of an output current of a fourth bridge arm based on distribution network information; obtaining a sample value of the output current of the fourth bridge arm, subtracting the sample value from the reference value of the output current of the fourth bridge arm to obtain a fourth difference; and performing feedback closed-loop control on the fourth difference, and performing feedforward control on an output voltage of the fourth bridge arm additionally to obtain a fourth bridge arm modulation wave;

obtaining a three-phase bridge arm NPC circuit switching signal based on the three-phase bridge arm modulation wave; obtaining a three-phase bridge arm NPC circuit output voltage based on the three-phase bridge arm NPC circuit switching signal; obtaining a fourth bridge arm NPC circuit switching signal based on the fourth bridge arm modulation wave; obtaining a fourth bridge arm NPC circuit output voltage based on the fourth bridge arm NPC circuit switching signal; and performing feedback closed-loop control on a capacitor voltage of each submodule of the CHB circuit separately to obtain a voltage-stabilizing active vector of each submodule of the CHB circuit;

obtaining a three-phase bridge arm CHB circuit switching signal based on the three-phase bridge arm modulation wave, the three-phase bridge arm NPC circuit output voltage, and the voltage-stabilizing active vector of each submodule of the CHB circuit; and obtaining a fourth bridge arm CHB circuit switching signal based on the fourth bridge arm modulation wave, the fourth bridge arm NPC circuit output voltage, and the voltage-stabilizing active vector of each submodule of the CHB circuit; and performing adaptive control on the fault control-oriented economically-integrated medium-voltage grid-connected device based on the three-phase bridge arm CHB circuit switching signal and the fourth bridge arm CHB circuit switching signal.

2. The adaptive control method according to claim 1, wherein obtaining the reference value of the reactive compensation current based on the preset reactive compensation instruction comprises:

issuing the preset reactive compensation instruction by a higher-level dispatch system, denoted as $Q_z^*$ so that the reference value of the reactive compensation current $I_{zq}^*$ is denoted by the following relation:

$$I_{zq}^* = \frac{2Q_z^*}{3U_d}$$

wherein, $U_d$ is an active vector of a grid voltage.

3. The adaptive control method according to claim 2, wherein the performing feedback closed-loop decoupling control on the second difference and the third difference to obtain a three-phase bridge arm modulation wave comprises:

$$\begin{cases} V_d = -(K_{pi} + K_{ii}/s)(I_{zd}^* - I_{zd}) + \omega L I_{zq} + U_d \\ V_q = -(K_{pi} + K_{ii}/s)(I_{zq}^* - I_{zq}) - \omega L I_{zd} + U_q \end{cases}$$

$$\begin{bmatrix} u_a^*(t) \\ u_b^*(t) \\ u_c^*(t) \end{bmatrix} = \begin{bmatrix} \cos\theta & -\sin\theta & 1 \\ \cos(\theta-120°) & -\sin(\theta-120°) & 1 \\ \cos(\theta+120°) & -\sin(\theta+120°) & 1 \end{bmatrix} \begin{bmatrix} V_d \\ V_q \\ 0 \end{bmatrix}$$

wherein, $u_a^*(t)$, $u_b^*(t)$, and $u_c^*(t)$ are three-phase bridge arm modulation waves; θ is an angle between a d-axis and a phase reference axis; @ is an angular frequency of a power grid; and L is a filter inductance value; $V_d$ represents the d-axis component of the three-phase bridge arm modulation wave; $V_q$ represents a q-axis component of the three-phase bridge arm modulation wave; $U_q$ represents a reactive vector of the grid voltage; $K_{pi}$ represents a proportional coefficient of a PI controller; $K_{ii}$ represents an integral coefficient of the PI controller; I zd represents the reference value of the voltage-stabilizing active current; $I_{zd}$ represents the sample value of the voltage-stabilizing active current; $I_{zq}$ represents the sample value of the reactive compensation current; s represents a variable in a complex frequency domain.

4. The adaptive control method according to claim 3, wherein calculating the reference value of the output current of the fourth bridge arm based on distribution network information comprises:

using the following relation to represent the reference value of the output current $I_{z0}^*$ of the fourth bridge arm when a single-phase grounding fault occurs on phase x:

$$I_{z0}^* = (\dot{E}_y - \dot{E}_x)(1/r_{0y} + j\omega C_{0y}) + (\dot{E}_w - \dot{E}_x)(1/r_{0w} + j\omega C_{0w})$$

wherein, $\dot{E}_x$ is an x-phase power-grid phase voltage; $\dot{E}_y$ and $\dot{E}_w$ are power-grid phase voltages of remaining two phases other than the x-phase; $r_{0y}$ and $r_{0w}$ are resistances-to-ground of the remaining two phases other than the x-phase; and $C_{0y}$ and $C_{0w}$ are capacitances-to-ground of the remaining two phases other than the x-phase; j represents an imaginary unit of a complex number.

5. The adaptive control method according to claim 4, wherein the performing feedback closed-loop control on the fourth difference, and performing feedforward control on an output voltage of the fourth bridge arm additionally to obtain a modulation wave of the fourth bridge arm comprises:

$$u_0^*(t) = \left(K_p + \frac{2K_r\omega_c s}{s^2 + 2\omega_c s + \omega_0^2}\right)(I_{z0}^* - I_{z0}) + u_0(t)$$

wherein, $u_0^*(t)$ is the modulation wave of the fourth bridge arm; $K_p$ and $K_r$ are a proportional coefficient and an integral coefficient of a PR controller respectively; $\omega_c$ is a resonant frequency band width; $\omega_0$ is a resonant frequency point; $I_{z0}$ is an output current of the fourth bridge arm; and $u_0(t)$ is an output voltage of the fourth bridge arm.

6. The adaptive control method according to claim 5, wherein the obtaining a three-phase bridge arm NPC circuit switching signal based on the three-phase bridge arm modulation wave comprises:

$$S_{x1} = \begin{cases} 0 & u_x^*(t) < \frac{U_{dc}}{4} \\ 1 & u_x^*(t) \geq \frac{U_{dc}}{4} \end{cases}$$

$$S_{x2} = \begin{cases} 0 & u_x^*(t) > -\frac{U_{dc}}{4} \\ -1 & u_x^*(t) \leq -\frac{U_{dc}}{4} \end{cases}$$

wherein, $U_{dc}$ represents a reference value of a DC-side voltage of the NPC circuit, $S_{x1}$ and $S_{x2}$ represent switching functions of an upper bridge arm and a lower bridge arm of an $x^{th}$-phase NPC circuit respectively; and $u_x^*(t)$ represents a modulation wave of an $x^{th}$-phase bridge arm; and the obtaining a three-phase bridge arm NPC circuit output voltage based on the three-phase bridge arm NPC circuit switching signal comprises:

$$u_{npcx}(t) = \frac{U_{dc}}{2}(S_{x1} + S_{x2})$$

wherein, $u_{npcx}(t)$ represents an output voltage of the $x^{th}$-phase NPC circuit.

7. The adaptive control method according to claim 6, wherein obtaining the fourth bridge arm NPC circuit switching signal based on the fourth bridge arm modulation wave comprises:

using the following relation to represent switching angles of the fourth bridge arm NPC circuit within a unit period of the modulation wave of the fourth bridge arm, denoted as $\theta_1$ to $\theta_4$:

$$\begin{cases} \theta_1 \in [0, \pi/2) \\ \theta_2 = \pi - \theta_1 \\ \theta_3 = \pi + \theta_1 \\ \theta_4 = 2\pi - \theta_1 \end{cases}$$

therefore, using the following relation to represent a calculation formula of an output voltage $u_{npc0}(t)$ of the fourth bridge arm NPC circuit:

$$u_{npc0}(t) = \frac{U_{dc}}{2}(S_{01} + S_{02})$$

wherein, $S_{01}$ and $S_{02}$ are switching functions an upper bridge arm and a lower bridge arm of the fourth bridge arm NPC circuit respectively, and are represented by the following relation:

$$S_{01} = \begin{cases} 0 & t \in \left[0, \frac{\theta_1}{\omega}\right) \cup \left(\frac{\theta_1}{\omega}, \frac{2\pi}{\omega}\right] \\ 1 & t \in \left[\frac{\theta_1}{\omega}, \frac{\theta_2}{\omega}\right] \end{cases}$$

$$S_{02} = \begin{cases} 0 & t \in \left[0, \frac{\theta_3}{\omega}\right) \cup \left(\frac{\theta_4}{\omega}, \frac{2\pi}{\omega}\right] \\ -1 & t \in \left[\frac{\theta_3}{\omega}, \frac{\theta_4}{\omega}\right] \end{cases}$$

wherein, $\omega = 2\pi/T$, wherein T is a grid voltage cycle;
assuming that a time domain expression $u^*_{0t}(t)$ of the modulation wave of the fourth bridge arm and a fault compensation current $i^*_{z0}(t)$ of the fourth bridge arm respectively are:

$$\begin{cases} u^*_{0t}(t) = U_m \sin \omega t \\ i^*_{z0}(t) = I_m \sin(\omega t + \varphi) \end{cases}$$

wherein, $U_m$ and $I_m$ a modulation voltage amplitude and a compensation current amplitude respectively, and $\varphi$ is a power factor angle,
using the following relation to represent energy fluctuation $\Delta E$ of the fourth bridge arm CHB circuit in a unit period:

$$\Delta E = \int_0^T u^*_{chb0}(t) i^*_{z0}(t) dt = \int_0^T [u^*_{0t}(t) - u^*_{npc0}(t)] i^*_{z0}(t) dt$$

$$= \frac{I_m \cos \varphi [\pi U_m - 2U_{dc} \cos(\theta_1)]}{\omega}$$

wherein, $u^*_{chb0}(t)$ represents a modulation voltage of the fourth bridge arm CHB circuit;
when energy fluctuates by $\Delta E = 0$ within a unit period, a capacitor voltage of a CHB circuit submodule is stable, and therefore, when the capacitor voltage of the CHB circuit submodule is stable, the switching angle $\theta_1$ is represented by the following relation:

$$\theta_1 = \arccos\left(\frac{\pi U_m}{2U_{dc}}\right)$$

therefore, the switching functions $S_{01}$ and $S_{02}$ of the upper bridge arm and the lower bridge arm of the fourth bridge arm NPC circuit are rectified as $S_{001}$ and $S_{002}$ respectively:

$$S_{001} = \begin{cases} 0 & u^*_0(t) < U_m \sin \theta_1 \\ 1 & u^*_0(t) \geq U_m \sin \theta_1 \end{cases}$$

$$S_{002} = \begin{cases} 0 & u^*_0(t) < -U_m \sin \theta_1 \\ 1 & u^*_0(t) \geq -U_m \sin \theta_1 \end{cases}$$

the fourth bridge arm NPC circuit switching signal is obtained based on $S_{001}$ and $S_{002}$ and the fourth bridge arm modulation wave; and
the obtaining a fourth bridge arm NPC circuit output voltage $u_{npc0}(t)$ based on the fourth bridge arm NPC circuit switching signal comprises:

$$u_{npc0}(t) = \frac{U_{dc}}{2}(S_{001} + S_{002}).$$

8. The adaptive control method according to claim 7, wherein the performing feedback closed-loop control on the capacitor voltage of each submodule of the CHB circuit separately to obtain the voltage-stabilizing active vector of each submodule of the CHB circuit comprises:

$$\Delta v_{xj} = -K_{pd}(U^*_c - U_{cxj})\sin(\omega t + \varphi_x)$$

wherein, $\Delta v_{xj}$ represents a voltage-stabilizing active vector of a $j^{th}$ CHB circuit submodule of the $x^{th}$ phase; $U_{cxj}$ represents a capacitor voltage of the $j^{th}$ CHB circuit submodule of the $x^{th}$ phase; $U^*_c$ represents a reference value of the capacitor voltage of the CHB circuit submodule; and $\varphi_x$ represents a phase of the output current of the $x^{th}$ phase.

9. The adaptive control method according to claim 8, wherein obtaining the three-phase bridge arm CHB circuit switching signal based on the three-phase bridge arm modulation wave, the three-phase bridge arm NPC circuit output voltage, and the voltage-stabilizing active vector of each submodule of the CHB circuit comprises:
calculating a modulation voltage $u^*_{chbx}(t)$ of an $x^{th}$-phase CHB circuit, wherein the voltage of each phase in the three-phase bridge arm is calculated by a same method, and is represented by the following relation:

$$u^*_{chbx}(t) = u^*_x(t) - u_{npcx}(t)$$

wherein, $u^*_x(t)$ represents a bridge arm modulation wave of the $x^{th}$ phase, and $u_{npcx}(t)$ represents an NPC circuit output voltage of the $x^{th}$ phase;
calculating the CHB circuit submodule switching function based on the modulation voltage $u^*_{chbx}(t)$ of the $x^{th}$-phase CHB circuit to obtain an $x^{th}$-phase CHB circuit switching signal represented by the following relation:

$$S_{xj} = \begin{cases} 0 & u^*_{chbx}(t) < u_{trj} \\ 1 & u^*_{chbx}(t) \geq u_{trj} \end{cases}$$

wherein, $S_{xj}$ (j=1, 2, . . . , N) represents a switching function of an $x^{th}$-phase CHB circuit submodule, and $u_{trj}$ is a modulation carrier of a $j^{th}$ CHB unit submodule and corresponds to a phase $\pi/N$.

10. The adaptive control method according to claim 9, wherein obtaining the fourth bridge arm CHB circuit switching signal based on the fourth bridge arm modulation wave, the fourth bridge arm NPC circuit output voltage, and the voltage-stabilizing active vector of each submodule of the CHB circuit comprises:

calculating the modulation voltage $u^*_{chb0}(t)$ of the fourth bridge arm CHB circuit, represented by the following relation:

$$u^*_{chb0}(t) = u^*_0(t) - u_{npc0}(t)$$

calculating the CHB circuit submodule switching function based on the modulation voltage $u^*_{chb0}(t)$ of the fourth bridge arm CHB circuit to obtain a fourth bridge arm CHB circuit switching signal, represented by the following relation:

$$S_{0j} = \begin{cases} 0 & u^*_{chb0}(t) < u_{trj} \\ 1 & u^*_{chb0}(t) \geq u_{trj} \end{cases}$$

wherein, $S_{0j}$ (j=1, 2, . . . , N) represents a switching function of the fourth bridge arm CHB circuit submodule, and $u_{trj}$ is the modulation carrier of the $j^{th}$ CHB unit submodule and corresponds to a phase $\pi/N$.

\* \* \* \* \*